United States Patent [19]

Gray et al.

[11] Patent Number: 4,743,188

[45] Date of Patent: May 10, 1988

[54] APPARATUS FOR SEALING A POUR HEAD IN A MOLD FOR FORMING COMPOSITE PRODUCTS

[75] Inventors: John D. Gray, New Durham; William Hagar, Barrington, both of N.H.; Laurent Gaudreau, S. Berwick, Me.

[73] Assignee: Davidson Textron Inc., Dover, N.H.

[21] Appl. No.: 63,826

[22] Filed: Jun. 19, 1987

[51] Int. Cl.⁴ .................. B29C 45/16; B29C 45/57
[52] U.S. Cl. .................... 425/123; 264/46.6; 277/34.3; 285/97; 425/129.1; 425/543; 425/567; 425/569
[58] Field of Search ............ 425/543, 546, 555, 567, 425/569, 817 R, 129 R, 127, 123; 264/46.6, 46.5; 285/96, 97; 277/34, 34.3, 34.6, 226; 249/93, 94, 96, 97

[56] References Cited

U.S. PATENT DOCUMENTS

| 1,215,189 | 2/1917 | Price | 285/97 |
|---|---|---|---|
| 2,369,823 | 2/1945 | Freed | 277/34.3 |
| 3,172,925 | 3/1965 | Preotle | 264/46.5 |
| 3,354,508 | 7/1965 | Draben | 425/449 |
| 3,440,308 | 4/1969 | Carbary et al. | 264/46.5 |
| 3,896,202 | 7/1975 | Palau | 264/46.5 |
| 4,030,267 | 6/1977 | Arnaud | 53/27 |
| 4,033,710 | 7/1977 | Hanning | 425/543 |
| 4,240,999 | 12/1980 | Decker, Jr. | 264/46.5 |
| 4,303,720 | 12/1981 | Clough | 428/211 |
| 4,420,447 | 12/1983 | Nakashima | 264/46.4 |
| 4,477,504 | 10/1984 | Bailey et al. | 428/138 |
| 4,630,648 | 12/1986 | McCord | 285/97 |

Primary Examiner—Jay H. Woo
Assistant Examiner—James C. Housel
Attorney, Agent, or Firm—John C. Evans

[57] ABSTRACT

A mold assembly for manufacturing composite plastic products includes a mold cavity part and a lid, which is joined to form a cavity for foam precursors. The precursors expand in the cavity in a known manner to fill the cavity with a suitable layer of foamed material, such as foamed urethane. The mold cavity supports an exterior shell and the lid supports an insert for reinforcing a finished composite product. A sleeve is integrally formed on the preformed shell and it in turn is located within an access port formed through wall of the cavity part to define a slideway for receipt of a pour head extension. The extension is selectively clamped and unclamped with respect to the shell sleeve by an inflatable seal clamp which is formed as an annular ring with a pressurizable passage connected to a source of selectively applied pressure. With the passages pressurized, an apex on the inside diameter of the ring will apply a highly localized pressure against the outer surface of the shell sleeve to hold the inner surface thereof in tight sealing engagement with the pour head extension.

15 Claims, 2 Drawing Sheets

APPARATUS FOR SEALING A POUR HEAD IN A MOLD FOR FORMING COMPOSITE PRODUCTS

FIELD OF THE INVENTION

This invention relates to molded plastic products and more particularly to apparatus for defining a closed mold cavity into which foam precursors are poured to form a weightless layer of foam material on the back side of a preformed exterior shell of the composite product.

BACKGROUND OF THE INVENTION

Various proposals have been suggested to provide a closed mold cavity for maintaining foam precursors under pressure during the foaming process so as to prevent voids from forming on the backside of an outer shell component of a formed composite product resulting from the molding process.

PRIOR ART

U.S. Pat. No. 3,354,408 discloses a charge fitting for a plastic molding apparatus which includes an elastomeric valve disk that engages a nozzle for injecting plastic material into a cavity between first and second mold parts. In this arrangement the nozzle is sealed as it is directing plastic into the mold apparatus. The fitting will seal the charge within the mold when the nozzle is removed therefrom. While suitable for its intended purpose, the molding apparatus does not include a preformed shell on one of the mold cavity parts. In such cases, a rear wall mounted pour head access port has to bridge the shell. It is important to provide a seal in close proximity to the shell to prevent the formation of voids in the foam material reacted within the mold cavity to form a foam backing on the inside surface of the shell. The charge fitting in the U.S. Pat. No. 3,354,508 patent is not configured to address the problem of how to bridge such a preformed shell component during the molding process.

U.S. Pat. No. 4,030,267 discloses a mold packaging system wherein a lid carries an inlet duct with a ring of elastic material. When the lid is closed, a plug is selectively connected on the inlet duct to engage the ring to prevent the escape of foam from the mold cavity. The fill system does not pass through a wall of a cavity mold that is arranged to have its cavity part covered by a preformed shell which comprises the exterior of a finished composite product.

U.S. Pat. No. 4,033,710 discloses a fill nozzle arrangement for directing thermoplastic material into a pour mold cavity. The fill nozzle includes a pair of shutter jaws that are made of flexible material. The jaws close around an insert tube for injecting a foaming agent into the foam material during the molding process. The jaws do not seal against a preformed shell component of the assembly to prevent void formation on the back side thereof.

U.S. Pat. Nos. 4,303,720; 4,420,447 and 4,477,504 disclose processes for forming instrument panel composite structures in which an insert is supported on a lid for a mold cavity in which a skin is located. In these processes, the material is poured into the mold cavity when the lid is removed and the mold is enclosed to allow the foam precursors to expand and fill a foam cavity that will form a foam layer on the back side of the preformed shell of the composite structure. In such arrangements voids may form on the back side of the shell during the reaction of the foam precursors in the mold cavity.

SUMMARY OF THE INVENTION

An object of the present invention is to provide an improved apparatus for sealing a mold cavity having a preformed shell supported on a cavity mold part and an insert supported on the lid thereof by the provision of a pour head seal arrangement on the back side of the mold that will closely seal a pour head in the vicinity of the back side of the shell so that the foam precursors directed through the pour head into a mold cavity will be sealed sufficiently to minimize the formation of voids on the back side of the shell thereby to improve the exterior appearance of the finished composite article. In particular, the preformed shell that is supported on the cavity part of the mold includes an integrally formed sleeve thereon which forms part of the pour head seal. The sleeve is supportingly received within a port formed in the cavity part at a wall portion thereof. An extension on the pour head has an outer diameter which corresponds to that of the inside diameter of the sleeve. Furthermore, inflatable seal clamping means are provided in the wall of the cavity part to provide an annular seal selectively pressurizable against the integrally formed shell sleeve to cause it to seal against the outside diameter of the pour head extension so as to close the mold cavity at a closely spaced relationship to the inside surface of the shell thereby to reduce the formation of voids on the back side of the shell.

Yet another object of the present invention is to provide an improved pour fitting for a closed mold assembly of the type including a cavity part of the mold which carries a preformed shell defining the surface of a composite plastic article formed in the mold. A lid carries an insert and the lid is sealed with respect to the insert by a layer of impervious material formed across the inboard surface of the insert. The improved pour fitting includes a shell with an integral sleeve thereon that defines a slideway for an extension on a pour head for directing foam precursors into a cavity between the cavity part and the lid. The pour head is thereby positioned at a point in close proximity to the inside surface of the shell and to seal means around the sleeve which are operative to prevent leakage from the back side of the shell in the vicinity of the integral sleeve extension formed thereon.

Yet another object of the present invention is to provide apparatus of the type set forth in the preceding object, wherein the seal means is in the form of an inflatable ring seal clamp which is located in surrounding relationship with the outside surface of the integral sleeve of the shell so as to force it into sealed engagement with the pour head extension when foam precursors are directed into the mold cavity.

Still another object of the present invention is to provide an improved inflatable seal clamp for use in the apparatus of the preceding object that includes a generally triangularly cross-sectioned ring having an opening therethrough in communication with a source of pressure so as to inflate the ring to cause an apex portion thereof to apply a uniform, annular sealing pressure around the outer periphery of the integrally formed sleeve during injection of the foam precursors into the mold cavity.

These and other objects of the invention will be more apparent when taken in conjunction with the following detailed description of the invention with reference to the accompanying drawings.

The objects are achieved in one molding apparatus which includes a polyvinylchloride shell formed of dry powdered material. It is supported on the bottom and back side of the cavity part of the closed mold assembly and includes a sleeve extension thereon that extends part way through an opening in the rear wall of the cavity which supports a pour head having an extension thereon. The extension is directed into the sleeve portion of the shell, which serves as a guideway for piloting the pour head in place to fill the cavity. An inflatable seal clamp is supported in a cavity formed in a grooved segment of the rear wall closely adjacent to the inner surface of the cavity wall on which the shell is supported. The grooved segment supports the base of a triangularly cross-sectioned inflatable seal clamp so as to locate an apex portion formed on the inside diameter of the annular inflatable seal clamp against the outside diameter of the sleeve. The seal clamp is selectively connected to a source of pressure. When it is deflated it assumes a retracted position to enable the pour head extension to be easily inserted in place within the sleeve. The inflatable seal clamp can be connected to a source of pressure when the lid is closed against the cavity part of the mold to define a closed cavity for receiving foam precursors. When the inflatable seal clamp is under pressure, the apex portion is held tightly against the shell to produce an annular seal action around the sleeve and the pour head so as to maintain a closed condition at the fill point for the foam precursors and thereby to reduce the possibility of formation of voids on the back side of the shell during reaction of the foam precursors which form a foam backing on the shell.

DETAILED DESCRIPTION OF A PREFERRED EMBODIMENT

Figure 1:
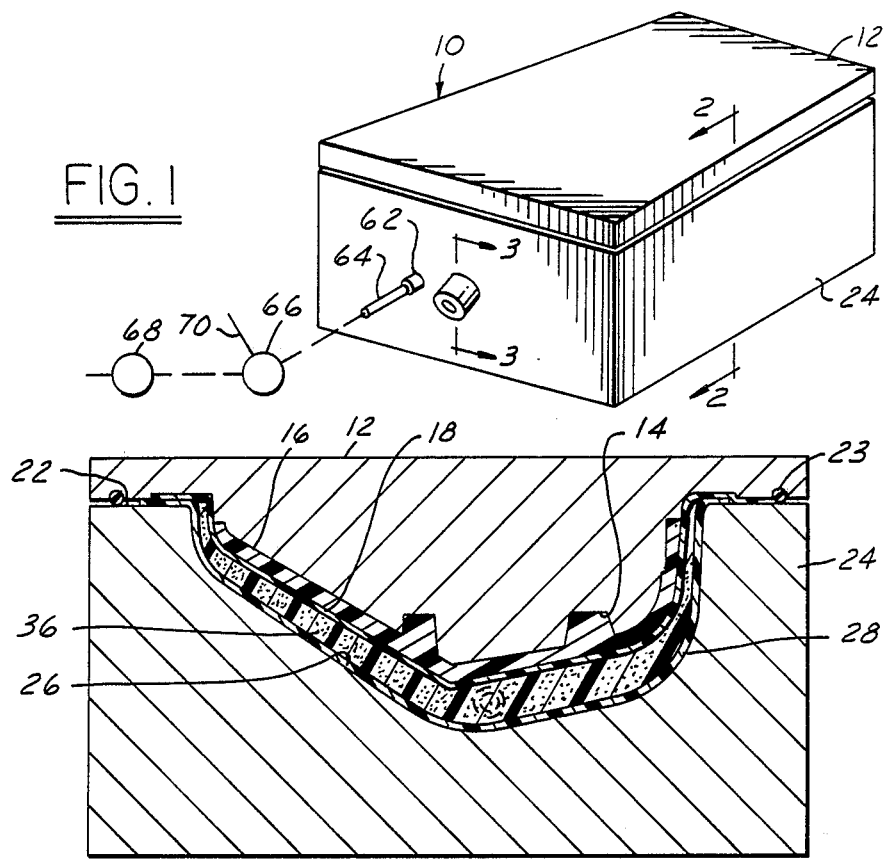
FIG. 1 is a perspective view of a mold apparatus including the present invention.
Figure 2:
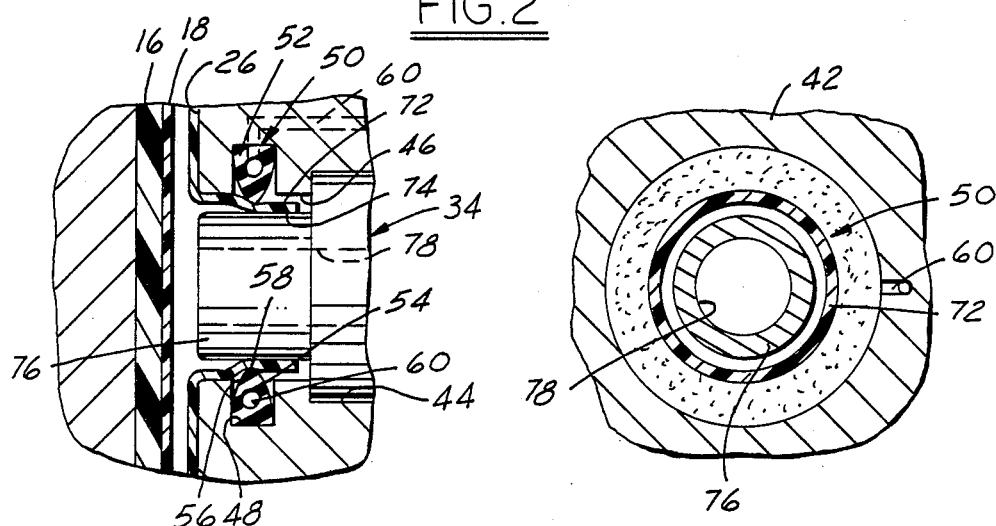
FIG. 2 is a cross sectional view taken along the line 2—2 of FIG. 1, looking in the direction of the arrows.
Figure 4:
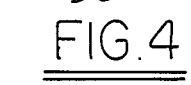
FIG. 4 is an enlarged cross sectional view taken along the line 4—4 of FIG. 3, looking in the direction of the arrows.
Figure 5:
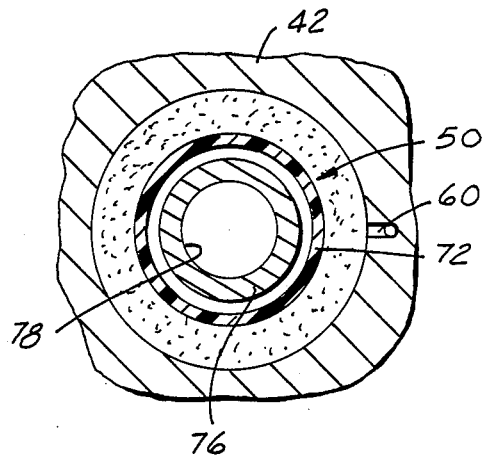
FIG. 5 is a cross sectional view taken along the line 5—5 of FIG. 3 showing the inflatable seal clamp pressurized to form a seal action around both the preformed sleeve and pour head components.
Figure 6:
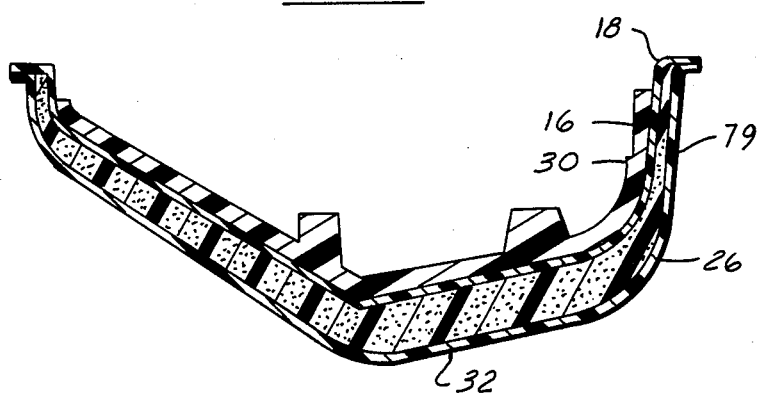
FIG. 6 is a cross-sectional view of an article formed by use of the present invention.

Referring to FIG. 1, a closed foam mold assembly 10 is illustrated. It includes a removable lid or cover 12 that has a surface 14 thereon that supportingly receives a reinforcing insert 16 which can be manufactured of plastic material if desired by a process as set forth in copending U.S. patent application Ser. No. 889,016 filed July 25, 1986, which is commonly assigned. The insert can also be formed as a separate component and loaded onto the lid or cover 12. In the illustrated arrangement, the insert 16 is covered by a layer of film 18 bonded thereto. In the illustrated arrangement, the film layer 18 extends to the periphery of the insert 16 and is arranged to seal against the peripheral surface 22 of a mold cavity part 24. A peripheral seal 23 on the lid 12 closes the mold to seal foam precursors poured into the mold. The mold cavity part has an inboard surface 26 thereon that, in accordance with the present invention, supports a preformed shell 28 that forms the outer surface of a completed composite article 30 which is shown in cross section in FIG. 6. The outer surface 32 of the article 30 is formed by the shell 28. It is important that the molded article have a solid backing of material behind the shell 28 to assure that the outer surface 32 on the finished composite article 30 will have an even, high quality appearance.

Figure 3:
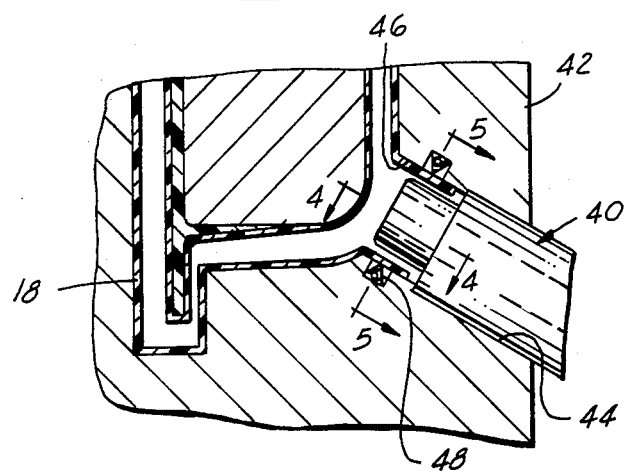
FIG. 3 is a fragmentary vertical sectional view taken along the 3—3 of FIG. 1, looking in the direction of the arrows.

Accordingly, the present invention includes an improved pour head seal assembly 34 that will provide for the passage of foam precursors into a space 36 formed in the closed mold assembly 10 between the insert 16 supported on the lid or cover 12 and the inside surface 38 of the preformed shell 28. The pour head seal assembly 34 more particularly includes an opening 40 in the rear wall 42 of the mold cavity part 24 as best shown in FIG. 3. The opening 40 includes a large diameter end portion 44 and a smaller diameter inboard portion 46 that in turn is surrounded by an annular groove 48 in wall 42. The annual groove 48 supportingly receives an inflatable seal clamp 50. The seal clamp 50 has a flat base 52 that is supported by the base of the annular groove 48. It further includes a pair of convergent walls 54, 56 that intersect at an apex 58 on the inside diameter of the inflatable seal clamp 50. As shown in FIG. 3, the inflatable seal clamp 50 thereby has a triangular cross section in surrounding relationship to an annular internal passage 60 that is connected to a fitting 62. A conduit 64 connects fitting 62 to valve means 66 therein to selectively connect the passage 60 with a source of pressure such as a pump 68 or to an exhaust line 70. The smaller diameter inboard portion 46 of the opening is adapted to receive an integrally formed sleeve 72 on the shell 28. The integrally formed sleeve 72 will be piloted into the hole 40 at the smaller diameter portion 46 thereof when the lid is removed from the cavity part and during the loading of the shell into a seated relationship with the mold cavity part 24. Thus the sleeve 72 defines a pilot surface 74 to guide a pour head extension 76 into a seated relationship with the preformed shell 28 in the vicinity of the rear wall 42 of the cavity part 24. The pour head is connected to a supply of foam precursors (not shown) which are directed through a passage 78 in the extension 76 into the space 36 of the closed mold assembly 19 when the lid or cover 12 is closed in sealed relationship with the mold cavity part 24 as shown in FIG. 1.

The fact that the shell 28 includes an integrally cast pocket or pouchlike cavity as defined by the sleeve 72 enables the closed mold to be sealed tightly at the point of injection of the foam precursors into the mold cavity. The foam precursors can be selected so that when they are directed into the space 36, they will react to expand in a known manner to fill the space with a suitable layer 79 of foam material such as foamed urethane which is self-bonding to both the shell 26 and the film layer 18.

In accordance with the invention, during the entrance of the foam precursors into the space 36, the pump 68 is energized and the valve means 66 is positioned to cause high pressure air to enter the passage 60 so as to inflate the seal clamp 50 in surrounding relationship with the sleeve 72 to cause it to seal against the extension 76 at a point closely proximate to the inboard surface of the shell 28. The closure of the lid against the cavity and the seal action provided by the pour head seal assembly 34 of the present invention at such a rear wall location reduces formation of voids behind the shell 28 during foam fill and reaction in cavity 36. Consequently, the exposed surface 32 has an acceptable uniform appearance. Once the fill step is completed, the foam material is reacted. The part is then removed from the mold apparatus.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in anyway limiting, the invention may be practiced otherwise than as specifically described.

The embodiments of the invention in which an exclusive property or privilege is claimed are defined as follows:

1. Apparatus for manufacturing a composite plastic structure comprising: mold means including a cavity part and a lid part joined together to form a cavity with a mold surface, a preformed shell supported by the mold surface of said cavity part and including an integrally formed sleeve thereon, said cavity part having an opening extending therethrough for supportingly receiving the outside diameter of said sleeve to define a pour head access port to said mold cavity, a pour head selectively received with the sleeve, and means for seletively applying a radial clamping pressure on said sleeve against said pour head to prevent escape of foam material poured through said head into the cavity during a molding process.

2. Apparatus for manufacturing a composite plastic structure comprising a mold cavity part, a lid supported on said mold cavity part having insert carrying means formed thereon, said lid and said cavity being configured to form a fill space therebetween to mold foam material on an exposed surface of an insert carried on said lid, a preformed shell supported on said mold cavity part in overlying relationship therewith to define an outer surface on a composite plastic structure formed in the mold assembly, access means formed integrally on said shell to define a passage through said shell, means for receiving said access means for forming a passage in said cavity part through which a pour head can be located to have access to the space for expansion of foam within the cavity, and clamp means for selectively sealing said access means against said pour head during the fill and molding process to prevent escape of foam material from said cavity so as to maintain a desired pressure on the foam precursors during reaction thereof thereby to reduce void formation in the vicinity of said shell.

3. A sealed fill port for a mold apparatus including a lid part, a cavity part, and a preformed shell for covering the cavity part to form an exterior surface on a composite plastic structure to be formed therein in part by foam precursors supplied through a pour head, the improvement comprising: an integrally formed sleeve on the shell, said cavity part including a port therein receiving said sleeve to define a slideway for receiving a pour head for supplying foam precursors into a mold cavity formed between the lid and the cavity part, and clamp means located in surrounding relationship to said sleeve for selectively applying a clamping action against said pour head through said sleeve to secure said sleeve to the pour head so as to prevent escape of foam precursors from the mold and to maintain the mold cavity under pressure during reaction of the foam precursors therein whereby the shell has a solid backing formed across the back side thereof.

4. Apparatus for manufacturing a composite plastic structure comprising mold means including a cavity part and a lid part joined together to form a cavity with a mold surface, a preformed shell supported by the mold surface of said cavity part and including an integrally formed sleeve thereon, said cavity part having an opening extending therethrough for supportingly receiving the outside diameter of said sleeve to define a pour head access port to said mold cavity, a pour head selectively positioned in said port, means on said pour head constituting an extension thereon slidably received within said sleeve, and clamp means selectively activated for applying selective clamping pressure on said sleeve against said pour head extension, whereby the outer surface of said extension is sealed by said sleeve when the clamp means is activated to prevent escape of foam material from said cavity during a molding process.

5. In the combination of claim 1, said clamp means including an inflatable member and means for selectively inflating said member to apply a clamping pressure on said sleeve against said pour head.

6. In the combination of claim 2, said clamp means including an inflatable member and means for selectively inflating said member to seal said access means against said pour head.

7. In the combination of claim 5, said inflatable member consisting of a hollow O-ring surrounding said sleeve and having an inside diameter thereof engaged with said sleeve to apply such clamping pressure.

8. In the combination of claim 7, said O-ring having a triangular cross section with an apex region through which the clamping pressure is applied.

9. In the combination of claim 6, said inflatable member consisting of a hollow O-ring surrounding said sleeve and having an inside diameter thereof engaged with said sleeve to apply such clamping pressure.

10. In the combination of claim 9, said O-ring having a triangular cross section with an apex region through which the clamping pressure is applied.

11. In the sealed fill port improvement of claim 3, said clamp means including an inflatable member and means for selectively inflating said member to apply a clamping pressure on said sleeve against said pour head.

12. In the sealed fill port improvement of claim 11, said inflatable member consisting of a hollow O-ring surrounding said sleeve and having an inside diameter thereof engaged with said sleeve to apply such clamping pressure.

13. In the combination of claim 4, said clamp means including an inflatable member and means for selectively inflating said member to apply a clamping pressure on said sleeve against said pour head.

14. In the combination of claim 13, said inflatable member consisting of a hollow O-ring surrounding said sleeve and having an inside diameter thereof engaged with said sleeve to apply such clamping pressure.

15. In the combination of claim 14, said O-ring having a triangular cross section with an apex region through which the clamping pressure is applied.

* * * * *